United States Patent [19]

Farukhi et al.

[11] 4,066,908

[45] Jan. 3, 1978

[54] WELL-TYPE SCINTILLATION ASSEMBLY

[75] Inventors: Mohammad R. Farukhi, Willoughby; George A. Mataraza; Oley D. Wimer, both of Euclid, all of Ohio

[73] Assignee: The Harshaw Chemical Company, Cleveland, Ohio

[21] Appl. No.: 672,206

[22] Filed: Mar. 31, 1976

[51] Int. Cl.² ................................................ G01J 1/58
[52] U.S. Cl. ................................ 250/483; 250/361 R; 250/487
[58] Field of Search .................... 250/361 R, 362, 368, 250/328, 483, 487

[56] References Cited

U.S. PATENT DOCUMENTS

| | | | |
|---|---|---|---|
| 2,855,520 | 10/1958 | Stoddart et al. | 250/361 |
| 3,591,807 | 7/1971 | Mays et al. | 250/366 |

*Primary Examiner*—Davis L. Willis

*Attorney, Agent, or Firm*—James A. Lucas

[57] ABSTRACT

A scintillation detector assembly is described which employs a scintillation phosphor such as a thallium activated sodium iodide crystal, wherein a blind hole is machined in the crystal to improve the efficiency of measuring the degradation rate of a radioactive material placed therein. The performance of the assembly is defined by the energy resolution of the radiation emanating from the radioactive source. This performance is improved by balancing the collection of light from areas of low and high light collection. This is achieved by suitably preparing the surfaces of the crystal and by controlling the reflectivity of these surfaces using controlled and fixed reflectivity material such as optical filters, cellulose ester-type fibrous paper and like materials. Improvements in resolution of 30 - 50% over prior art well assemblies have been measured for radioactive sources such as $^{129}I_{53}$.

15 Claims, 1 Drawing Figure

WELL-TYPE SCINTILLATION ASSEMBLY

BACKGROUND OF THE INVENTION

1. Field of the Invention

This invention relates to the field of ionizing radiation detection. More particularly, the invention relates to scintillation detectors of the type that are typically coupled to a photomultiplier tube and are used for radiation monitoring such as clinical measurement of isotopes. The invention specifically relates to well-type scintillation counters having a high efficiency for measuring the degradation rate of radiopharmaceutical solutions and resolving the distribution of energy emanating from the radioactive source.

2. Description of the Prior Art

Radiation detection devices generally rely upon the property of substances called scintillation phosphors which, when irradiated with x-rays or gamma rays, are capable of converting the energy into light flashes. Each flash is referred to as an event.

The phosphor is coupled, optically, to a device such as a photomultiplier tube which converts the light flash or scintillation to an electrical impulse, and which amplifies the same. The amplified current output from the tube is sent to electronic devices which display the information in usable form. Through the scintillation counter has become a familiar instrument for the detection of many types of ionizing radiation in a wide variety of applications, more sophisticated utilization of scintillation phosphors has demanded an increasing attention to the improvements in quantifying the degradation rates of radioactive sources and simultaneously improving the resolution of energy distribution of the incident radiation.

Improvements in the counting efficiency of the source, that is, the ability to record the number of events per unit time detected by the phosphor as compared to the degradations suffered by the source which results in the emanation of an x-ray or gamma ray, has been achieved by machining a blind hole or well in a phosphor, typically a circular hole in a right cylinder, and placing the radioactive material as close to the bottom of such a hole as the surrounding housing permits. The ideal situation would be to place th source in the center of a sphere, thereby insuring that the radiation which is emanated isotropically will always interact with the phosphor material. The machining of holes in a solid phosphor departs from idealism and disturbs the geometrical aspects associated with the collection of light uniformly at any given surface to which the photomultiplier may be coupled.

Prior attempts to equalize light collection output in detector assemblies have involved polishing various portions of the crystal while roughening other portions; using reflective or absorptive coatings or paint upon the surface of the protective housing in which the crystal is placed; the use of packing powders of magnesium oxide or aluminum oxide having specified reflective properties, around the crystal, etc. These efforts have all involved time-consuming additional steps in the assembly and have contributed considerably to the cost of the same. In addition, reproducability from one crystal to another has been difficult to obtain, and within each crystal, efforts to closely regulate the optical properties at various locations within the crystal assembly have been frustrating.

One such prior art method of altering the surface reflectivity of a scintillation crystal assembly is described in U.S. Pat. No. 3,102,955. This patent attempts, with some success, to improve the uniformity of scintillation light output by compensating the reflector system by polishing. This patent does not deal with well-type assemblies having a blind hole in the crystal and attempts to use similar techniques with well assemblies have been expensive and have met with marginal success.

SUMMARY OF THE INVENTION

One object of the present invention is to improve the uniformity of light output from a well-type scintillator assembly.

Another object is to upgrade the resolution and light gathering efficiency of a well-type scintillation assembly by improving the collection of light from areas of the assembly prone to loss of light intensity due to multiple relfections, and degrading the collection from areas close to the photomultiplier tube.

Yet another object is the balancing of light output from a scintillation phosphor by careful preparation of the surfaces of the crystal phosphor and by utilizing materials on these surfaces having uniformly controlled reflectivity and absorption.

Still another object is a method of facilitating the manufacture of well-type assemblies and insuring their integrity under normal usage.

This invention has particular applicability to a well-type scintillation assembly composed of an inorganic crystal body in the shape of a right cylinder having a front circular face optically coupled to a photomultiplier tube, and a back face optically and physically remote from the tube. The assembly contains a well extending in an axial direction into the crystal from the back face towards the front face. The depth of the well is typically between one-half and three-quarters of the total distance between the two faces.

The aforementioned advantages, as well as others, are achieved by using a highly effective and uniform layer of optical filter paper for the purpose of light absorption in the region of high light intensity at the bottom of the well, a cylindrical sheet of highly reflective cellulosic material around the well and an annular disc of the reflective material at the back face of the assembly.

DETAILED DESCRIPTION OF THE INVENTION

Figure 1:
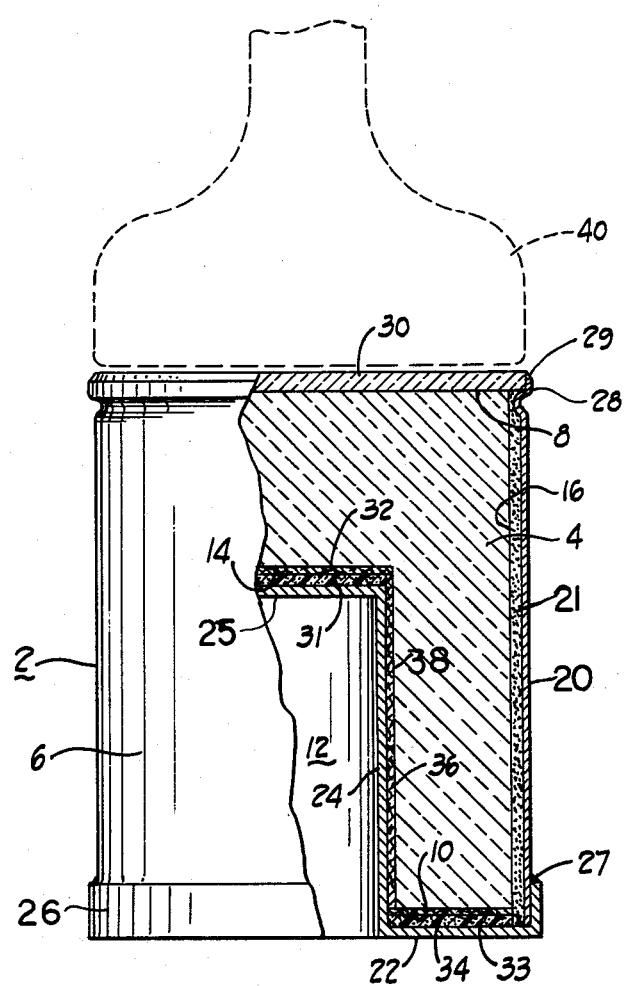
FIG. 1 is an elevation, partially in cross-section, of a well-type inorganic crystal assembly coupled to a photomultiplier tube.

The present invention is applicable to any inorganic scintillation crystal, whether doped or self-activated, having the capability of stopping ionizing radiation. Examples of suitable crystals are NaI(Tl), CsI(Na), LiI(Eu), $CaF_2$(Eu) and others.

The crystal is typically enclosed in a metallic housing which protects the crystal from physical abuse and damage, provides a barrier to external light entering the crystal, and prevents moisture from reaching and damaging the crystal, if hygroscopic. One face of the crystal is optically coupled to a glass or quartz window which in turn is coupled to a photomultiplier. The well of the crystal is surrounded by a thin aluminum wall — aluminum being chosen because of its high transparency to gamma rays. The radioactive source, in the form of a vial or a solution encased in a suitable nonreactive material such as polyethylene is inserted into the well for the purpose of being analyzed. The bottom of the well due to its proximity to the photomultiplier tube is a region of high light intensity. The back face of the crystal and the region of the crystal adjacent to the walls of the well are areas from which light is poorly collected since the light has to suffer multiple reflections before it is directed towards the front face of the crystal and eventually into the photocathode. At each reflection there is some light which escapes into the media surrounding the crystal and though part of the light is reflected back into the crystal, a part is essentially lost in this media.

Referring now to FIG. 1, there is shown a well-type scintillation assembly 2 comprising a generally cylindrical scintillation crystal 4 having a front face 8, an annular back face 10, an outer wall 16, and a hole or well 12 extending from the back face between one-half and three-quarters of the distance to the front face toward the front face but terminating short thereof. The well typically extends of the crystal. The bottom 14 of the well is circular and is parallel with the front face 8 and the side 36 of the well is cylindrical. The entire crystal is encased in a suitable housing which for simplification of assembly is composed of a cylinder 20 and end cap 22. The end cap includes a cylindrical portion 24 extending into the well and closed at the bottom 25, and a flange 26 slip fitted around the outer cylinder 20 and hermetically sealed with an epoxy resin 27. The front face is highly polished and is covered by an optical window of glass or quartz 30 held in place by lip 28 on cylinder 20 with an epoxy resin 29 forming a hermetic seal. The window 30 may be cemented to the crystal 4 by an optically clear epoxy resin.

A photocathode 40 is optically coupled to the window 30 bu means of a coupling agent such as silicone oil or grease and detects light flashes or scintillation events occurring within the crystal. The photocathode converts each flash to an electrical signal. Each signal is amplified and is displayed on an oscilloscope or other read-out device, or is fed to a multi-channel analyzer or other suitable device, all of which are well known in the art.

With a source of ionizing radiation placed in the well 12, the scintillation events generated in the crystal adjacent the bottom 14 of the well traverse to the photocathode in a relatively straight line without suffering numerous reflections. Hence this is a region of high light collection. Conversely, the light generated at the back face 10 and along the side 36 and outer wall 16 of the crystal suffers numerous reflections before eventually reaching the photocathode. The portion of the crystal bounded by these surfaces is a region of poor light collection.

The light intensity is reduced in the region of the crystal near the bottom 14 of the well by polishing the bottom 14 to a smooth finish and placing an optical filter 32 in contact with the crystal. An optical filter capable of uniformly absorbing between 10 and 90, preferably between 50 and 90% of the light across the entire scintillation spectrum between 3300 A and 5000 A can be used. The filter is held against the crystal by a pad 31 of foam compressed between the filter and the cylindrical portion of the end cap. Open cell polyethylene foam is satisfactory for this purpose.

One specific type of optical filter that can be easily incorporated into the crystal assembly and that has uniform adsorption capabilities is marketed under the trademark Formatt ® by Graphic Products Corporation. This material is available in a variety of grid patterns including uniform or graduated patterns of dots, concentric circles, parallel lines and cross-hatching, and the pattern is printed on a matte acetate film. One surface of the film is coated with a low-tack adhesive which, in the present invention, is pressed against the foam pad 31. Best results are obtained where the pattern of the filter is large compared to the wave length of light but is fine when compared to the effective area in which the scintillation event occurs.

The outer and inner cylindrical surfaces of the crystal 16 and 36 and the back face 10 are roughened with #150 emery paper or equivalent. The inner cylindrical surface 36 is sanded in straight lines in an axial direction while the other two surfaces are sanded in an orbital pattern defining $\frac{1}{8}$ inch to $\frac{1}{2}$ inch circles.

A uniformly reflective cellulose ester-type paper is used as a lining 38 along the inside of the well between the crystal and the cylindrical portion 24 of the end cap, the electrostatic charge of the paper serving to keep it in contact with the crystal surface. A second sheet of reflective paper 34 is held in place against the back face 10 of the crystal by a layer of foam 33 compressed between the end cap 22 and the crystal. One specific type of cellulose ester paper that has been found to work particularly well is microporous filter paper manufactured by the Millipore Filter Corp. The reflectivity of this paper, when compared to packed MgO is typically about 95-98% in the wavelength range of 400 to 700 nanometers. This filter paper is available in sheets having a thickness of 4 mils and a uniform pore size of e.g. 22 microns.

The outer cylindrical surface 16 of the crystal is made highly reflective by packing the annulus between the crystal and the cylinder 20 with a suitable reflective powder 21 such as aluminum oxide. Magnesium oxide, barium sulfate and other powdery materials can also be used to accomplish the same objective. Although a cylinder of cellulose ester-type reflective paper could be used along this surface, the reflective powder serves the added function of keeping the crystal correctly positioned within the housing.

Crystals prepared according to the present invention have shown a dramatic and unexpected improvement over the prior art as examplified by the energy resolution shown in Table I for $^{129}I_{53}$ excitation for a 1¾ inch diameter × 2 inches high NaI(Tl) crystal having a 1½ inches deep by ¾ inch diameter well.

Table I

|  | Resolution | |
| --- | --- | --- |
|  | Prior Art | Present Invention |
| Sample #1 | 48.6% | 29.6% |
| Sample #2 | 51.2% | 29.4% |
| Sample #3 | 62.0% | 29.1% |
| Sample #4 | 53.3% | 26.7% |
| Sample #5 | 56.2% | 28.3% |

The prior art method of compensation included spraying the aluminum housing at the bottom of the well, the end cap in contact with the back face of the crystal and the cylindrical well surface with a highly reflective layer of aluminum oxide and painting the housing at the bottom of the well with black paint. The new procedure of the present invention involved sanding the crystal with #150 emery paper, using 50% absorbance 55 line Formatt ® No. 7032 optical filter paper in contact with the crystal at the bottom of the well, a liner of GSWP 304 FO Millipore filter paper for the side of the well and an annular disc of Millipore filter paper for the back face of the crystal.

When used as a substitute for an absorptive black coating applied to the well assembly, the use of the optical filter paper has the advantages of (1) more accurate control of the light reaching the photomultiplier tube, (2) more uniformly predictable results, (3) less time and expense in making a given scintillation assembly and (4) simpler to use. A Formatt ® No. 7055 filter paper having 85 lines and 70% absorption has been found to give commercially acceptable results with resolutions consistently below 30% when used in a Type AW or Type F Well Assembly manufactured by The Harshaw Chemical Company.

Surprisingly and unexpectedly, the use of the optical filter not only serves to degrade the intensity of the light in regions of high light output, but in addition and for some unexplained reason, improves the uniformity of the light intensity at the back face thereof. The results are even more significant, however, when the optical filter is coupled with the cellulosic reflective paper.

Although the present invention has been described in terms of specific reflectors and absorbers, and specific surface preparatory steps, it should be understood that the skilled practitioner can make substitutions and achieve improvements of 30% to 50% in resolution without departing from the scope of the invention. Even though #150 emery paper and specific patterns were used to sand or roughen the crystal surface, other techniques can be used without detracting from the overall effectiveness of the treatment. Furthermore, other absorptive sheet materials made by other manufacturers can be used in place of the Formatt ® filters and other types and grades of cellulosic ester-type reflective materials can replace the specific Millipore filter paper.

Well-type assemblies, and the well itself are generally cylindrical in cross-section. However, the present invention is applicable irrespective of the size and shape of the crystal and the well. Thus, oval, rectangular and other polyagonal crystals with cylindrical or polyagonal wells can be improved by utilizing the surface preparations and the absorbers and reflectors described herein.

Although the invention has been described and defined in terms of specific enabling embodiments, it should be understood that other embodiments can be utilized without departing from the present invention in which I claim:

1. In a well-type scintillation assembly including
   a. an inorganic scintillation crystal in the shape of a right cylinder having a front face, a back face, and a well extending axially in from the back face toward the front face but terminating short thereof,
   b. a housing conforming to the shape of said crystal and enclosing the same, and
   c. an optical window coupled to the front face of said crystal,
the improvement comprising
   a. a layer of an optically highly reflective material between said housing and said crystal along the side portion of said well and along the back face of said crystal, and
   b. an optically high adsorbing filter between said housing at the bottom of said well capable of uniformly adsorbing between 10 and 90% of the light emitted in the area of said crystal near the bottom of said well.

2. The assembly according to claim 1 wherein the inorganic crystal is NaI doped with thallium.

3. The assembly according to claim 2 wherein the optical filter consists of a sheet of optical filter paper capable of uniformly adsorbing between 50% and 90% of emitted light.

4. The assembly according to claim 3 wherein the resolution of the assembly when subjected to excitation by an $I^{129}$ source is below about 30%.

5. The assembly according to claim 2 wherein the reflective layer is composed of a cellulosic ester filter paper having a uniform pore size of about $22\mu$ and a thickness of about 4 mils.

6. In a well-type scintillation assembly utilizing an inorganic crystal with an optically visible front face, the improvement comprising
   a. The use of an optical filter in contact with the crystal in regions of high light intensity and capable of absorbing from about 10 to about 90% of the light emitted in these regions, and
   b. The use of a cellulosic-type layer of highly reflective material contacting the crystal in regions of low light intensity,
for the purpose of improving the uniformity of light flashes reaching the front face of the crystal.

7. In the assembly of claim 6, the improvement including the use of cellulose ester filter paper as the highly reflective material.

8. In the assembly of claim 6, the improvement including the use of an optical filter paper capable of uniformly absorbing between about 50 and about 90% of the emitted light.

9. In the assembly of claim 6, the optical filter paper is used in contact with the crystal at the bottom of the well.

10. In the assembly of claim 9, the surface of the crystal at the bottom of the well in contact with the filter paper is polished.

11. In the assembly of claim 6, the layer of highly reflective material is in contact with the surface of the crystal having a roughness equivalent to that obtained by sanding with #150 emery paper.

12. In the method of assembling a well-type scintillation assembly including a generally cylindrical inorganic scintillation crystal having a front face, a back face and a cylindrical well extending from the back face toward said front face, but terminating short thereof, and a housing conforming to and enclosing said crystal except for the front face thereof, said method including
   a. placing an optical filter in contact with said crystal at the bottom of said well, said filter capable of uniformly absorbing between 10 and 90% of the scintillation events occurring in the crystal in proximity of the filter,
   b. placing a sleeve of a cellulosic-type reflective material in contact with said crystal around the inside of said well and
   c. placing an annular disc of cellulosic-type reflective material in contact with the back face of said crystal.

13. The method of claim 12 wherein the crystal at the bottom of the well is polished before the optical filter is placed in contact therewith.

14. The method of claim 12 wherein the cylindrical wall of the well is roughened in a spiral pattern with a sand paper equivalent to #150 emery paper prior to placing the reflector material in contact therewith.

15. The method of claim 12 wherein the back face of the crystal is roughened by sanding in $\frac{1}{8} - \frac{1}{4}$ inch circular patterns with a sand paper equivalent to #150 emery paper.

* * * * *